United States Patent [19]

Choi

[11] Patent Number: 5,715,230

[45] Date of Patent: Feb. 3, 1998

[54] DEVICE FOR FEEDING A DISC IN AN AUTOCHANGER

[75] Inventor: Young-Beon Choi, Seoul, Rep. of Korea

[73] Assignee: Hyundai Electronics Industries, Co., Ltd., Kyoungki-Do, Rep. of Korea

[21] Appl. No.: 390,696

[22] Filed: Feb. 17, 1995

[30] Foreign Application Priority Data

Feb. 18, 1994 [KR] Rep. of Korea ............... 1994-2859
Jun. 30, 1994 [KR] Rep. of Korea ............. 1994-15514

[51] Int. Cl.[6] ....................... G11B 17/08; G11B 17/04
[52] U.S. Cl. ................................. 369/192; 369/178
[58] Field of Search ............. 369/36, 178, 191–192, 369/75.2, 77.1; 360/92

[56] References Cited

U.S. PATENT DOCUMENTS

| | | | |
|---|---|---|---|
| 2,616,706 | 11/1952 | Maurer | 369/192 |
| 2,935,325 | 5/1960 | Durant | 369/192 |
| 2,937,026 | 5/1960 | Acker | 369/192 |
| 4,979,160 | 12/1990 | Araki | 369/191 |
| 5,107,475 | 4/1992 | Serita et al. | 369/191 |
| 5,136,562 | 8/1992 | Staar | 369/36 |
| 5,163,040 | 11/1992 | Hake | 369/178 |
| 5,274,620 | 12/1993 | Sipos | 369/192 |
| 5,335,218 | 8/1994 | Osada | 369/192 |

FOREIGN PATENT DOCUMENTS 62-34355  2/1987  Japan ........................... 369/178

Primary Examiner—Stuart S. Levy
Assistant Examiner—Brian E. Miller
Attorney, Agent, or Firm—Morgan & Finnegan LLP

[57] ABSTRACT

A device for feeding discs in an autochanger is disclosed. The device feed, using a simple disc feeding mechanism, the compact discs between the disc magazines and the compact disc players of the autochanger through a rolling type feeding motion. Therefore, the discs are prevented from damage during the disc feeding operation. In the disc feeding operation, the edge of the disc rolls along guide rails so that it is possible to minimize the disc damage. The device of the invention reduces the size and weight of the autochanger and achieves the recent trend of compactness of the autochanger.

16 Claims, 19 Drawing Sheets

FIG.17
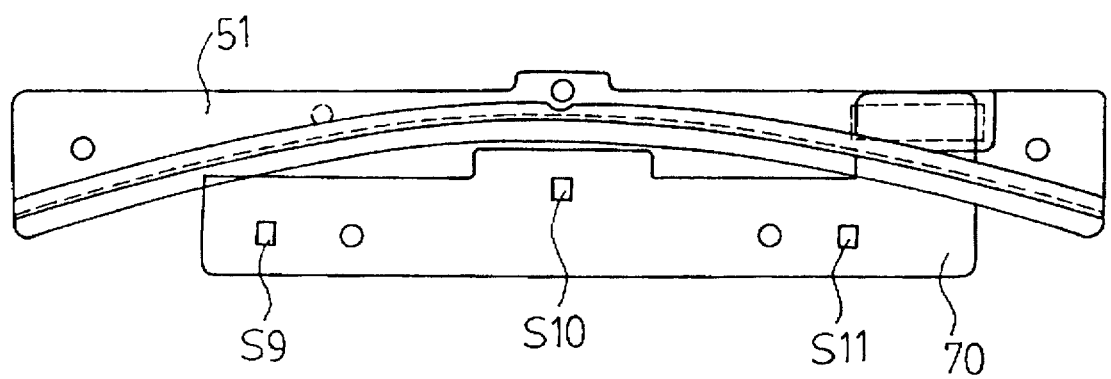
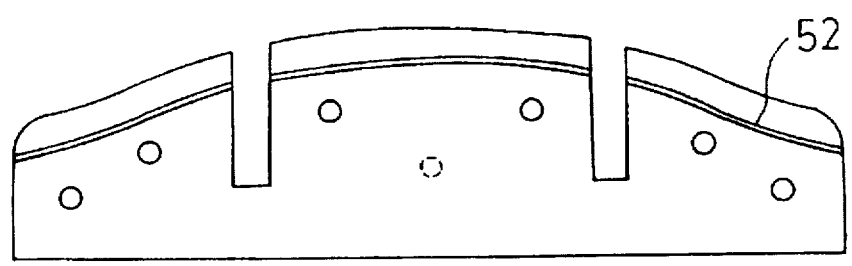

DEVICE FOR FEEDING A DISC IN AN AUTOCHANGER

BACKGROUND OF THE INVENTION

1. Field of the Invention

In general, the present invention relates to disc carriers in autochangers used with audio systems, or video systems. More particularly, the present invention relates to a method and device for feeding discs in such autochangers wherein the compact discs are fed between disc magazines and compact disc players of the autochangers through a rolling type feeding motion, and for preventing possible damage of the discs during the disc feeding operation.

2. Description of the Prior Art

With reference to FIG. 1, there is shown in a perspective view a construction of a conventional autochanger used with an audio system or with a video system. As shown in this drawing, the autochanger comprises a plurality of disc magazines 2 vertically placed on both sides of the interior of a housing 1. Each of the magazines 2 receives and keeps a plurality of compact discs 10 therein.

Placed under the disc magazines 2 in the interior of the housing 1 are compact disc players 3 and 3'. The above autochanger also includes a disc carrier 4 for feeding the compact discs 10 from the disc magazines 2 to the disc players 3 and 3' or from the disc players 3 and 3' to the disc magazines 2.

Typically, the autochanger includes four disc magazines 2 placed on each side of the interior of the housing 1. Each disc magazine 2 typically receives and keeps forty-five compact discs therein.

In operation of the above autochanger, the disc carrier 4 takes a disc 10 out of a magazine 2 while vertically reciprocating in the interior of the housing 1 and feeds the disc 10 to the disc players 3 and 3', thereby allowing the disc 10 to be played by the players 3 and 3'. After playing the disc 10, the carrier 4 takes the disc 10 out of the players 3 and 3' and returns the disc 10 to the magazine 2 so that the disc 10 is kept in its magazine 2.

Turning to FIG. 2, there is shown in a schematic plan view a disc feed mechanism of the above autochanger. As shown in FIG. 2, the conventional autochanger includes disc magazines 2. The magazines 2 are arranged on the same horizontal line and vertically placed on both sides of the interior of the housing 1 at regular intervals. This arrangement enlarges the disc keeping capacity of the autochanger. The carrier 4 is movably placed in the interior of the housing 1 such that the carrier 4 vertically reciprocates in the center space defined between the magazines 2 and feeds the discs 10 in a predetermined direction.

The carrier 4 has a configuration of an area including the space defined between the magazines 2 so that the carrier 4 somewhat reliably takes the discs 10 out of the magazines 2 and inserts the discs 10 into the magazines 2. The top surface of the carrier 4 is provided with a semicircular guide surface 5 for smoothly feeding the discs 10 between the magazines 2 and the carrier 4. The center of the semicircular guide surface 5 of the carrier 4 is provided with a roller 6 so that the discs 10 can roll on the guide surface 5. The carrier 4 further includes a push lever 7 and an insert lever 8. These levers 7 and 8 are adapted for pushing the disc 10 out of the magazine 2 and for inserting the disc 10 into the magazine 2 respectively. Both levers 7 and 8 have rotating angles sufficient for pushing and inserting the disc 10 respectively. The push lever 7 is placed in a position suitable for pushing the disc 10 out of the magazine 2, while the insert lever 8 is placed in a position suitable for inserting the disc 10 into the magazine 2.

When a compact disc 10 is to be fed from a magazine 2 to the disc drive mechanism by means of the above disc feed mechanism, the push lever 7 of the carrier 4 pushes the disc 10 out of the magazine 2 and to a predetermined position. At that position, the roller 6 of the carrier 4 comes into contact with the edge of the disc 10 and rotates in a forward or reverse direction in response to an electric signal, thus feeding the disc 10 to the center of the carrier 4 and stopping at the center.

Thereafter, the carrier 4 with the disc 10 moves to the compact disc players 3 and 3' and stops at the players. At this time, a rotating arm (not shown) rotates in a forward or reverse direction in response to an electric signal, thus handing the disc to the disc players 3 and 3' through a rolling motion. Thereafter, the push lever 7 is turned in response to an electric signal so as to feed the disc 10 to the center of the compact disc player so that the disc player can start to play the disc 10.

After playing the disc 10, the disc 10 is taken out of the disc player and returned to the magazine 2 through the above-described process, for keeping in the magazine 2.

However, the above autochanger has a problem in that, as each of the roller 6 and the push lever 7 is rotated in forward and reverse directions, and the reversible rotation of both members 6 and 7 is controlled by their sensors, the members 6 and 7 should be connected to their sensors through complicated connection lines. Additionally, both the roller 6 and the lever 7 should be precisely operated so that members 6 and 7, as well as their sensors, use expensive parts. Due to use of expensive parts, the cost of the autochanger is increased. Furthermore, the above autochanger should use many positional sensors.

Another problem with the above autochanger is that there is a frictional contact between the disc 10 and the guide surface 5 of the carrier 4. Therefore the disc 10 is apt to be damaged during the disc feeding operation.

SUMMARY OF THE INVENTION

It is, therefore, an object of the present invention to provide a method and device for feeding discs in an autochanger solving the above problems. It is also an object of the present invention to provide a method and device for feeding discs in an autochanger in which, using a simple disc feeding mechanism, the compact discs are fed between disc magazines and compact disc players of the autochanger through a rolling type feeding motion and in which possible damage of the discs during the disc feeding operation is prevented.

According to one aspect of the present invention, an improved disc feeding method for use with an autochanger comprising a forward feeding step for rolling and feeding the disc from a disc player or a magazine to the center of a carrier of the autochanger, and a reverse feeding step for rolling and feeding the disc from the center of the carrier to the magazine or to the disc player, is provided. The improvement comprises the steps of: feeding the disc from the disc player or the magazine to a predetermined first position on the carrier using a lever; feeding the disc from the predetermined first position on the carrier to the center of the carrier using an acute angle movement of an arm, the arm being placed in the disc feeding direction; and feeding the disc from the center of the carrier to the disc player or to the magazine by an obtuse angle movement of the arm when the lever reaches a predetermined second position of the carrier, the lever being opposed to the arm.

According to another aspect of the present invention, a disc feeding device is provided for a carrier of an autochanger. The carrier feeds discs between a plurality of disc magazines and a disc player. The disc feeding device comprises: a lever means further comprising a lever drive cam which is applied with rotating force from a lever drive motor and which feeds a disc from a magazine to a predetermined position on the carrier, and a pair of levers coupled to the lever drive cam through their associated lever links and selectively rotated in accordance with the rotating direction of the lever drive cam and which feeds the disc; arm means further comprising an arm drive cam which is applied with rotating force from an arm drive motor and which feeds the disc from the predetermined position on the carrier to the center of the carrier or from the center of the carrier to the magazine, and a pair of arms coupled to the arm drive cam through first and second arm links respectively and selectively rotated in accordance with rotating direction of the arm drive cam and which feed the disc; guide rail means for supporting and guiding the disc, the guide rail means comprising curved disc rails and curved holder rails; disc holder means for precisely seating the disc on the center of the carrier, the disc holder means comprising a disc holder selectively operated in accordance with the rotating direction of a disc holder drive cam, the disc holder drive cam being commonly mounted to a shaft of the lever drive cam and cooperating with the lever drive cam; and drive means further comprising first power transmission means for transmitting the rotating force of the lever drive motor to the lever means and to the disc holder means, and second power transmission means for transmitting the rotating force of the arm drive motor to the arm means.

In the above carrier of the autochanger of the invention, the disc kept in the magazine or seated on the disc player is fed to a predetermined position of the carrier by the levers and, at the same time, the disc holder is opened. After the lever motion, the arms are operated so as to feed the disc to the center of the carrier. At this time, the disc is stably seated on the carrier while the disc holders are returned to their original positions.

When the carrier with the disc is moved to the magazine or to the disc player, the disc holders which have tightened on the edge of the disc are removed, thus releasing the disc. Thereafter, the arm is operated so as to feed the disc from the center of the carrier to the magazine or to the top surface of the disc player.

At this time, the edge of the disc rolls along the guide rails so that it is possible to minimize disc damage during disc feeding operation of the carrier.

BRIEF DESCRIPTION OF THE DRAWINGS

The above and other objects, features and other advantages of the present invention will be more clearly understood from the following detailed description taken in conjunction with the accompanying drawings, in which:

FIG. 17 is a plan view of a guide rail unit of the carrier of the invention;

DETAILED DESCRIPTION OF THE PREFERRED EMBODIMENTS

Figure 1:
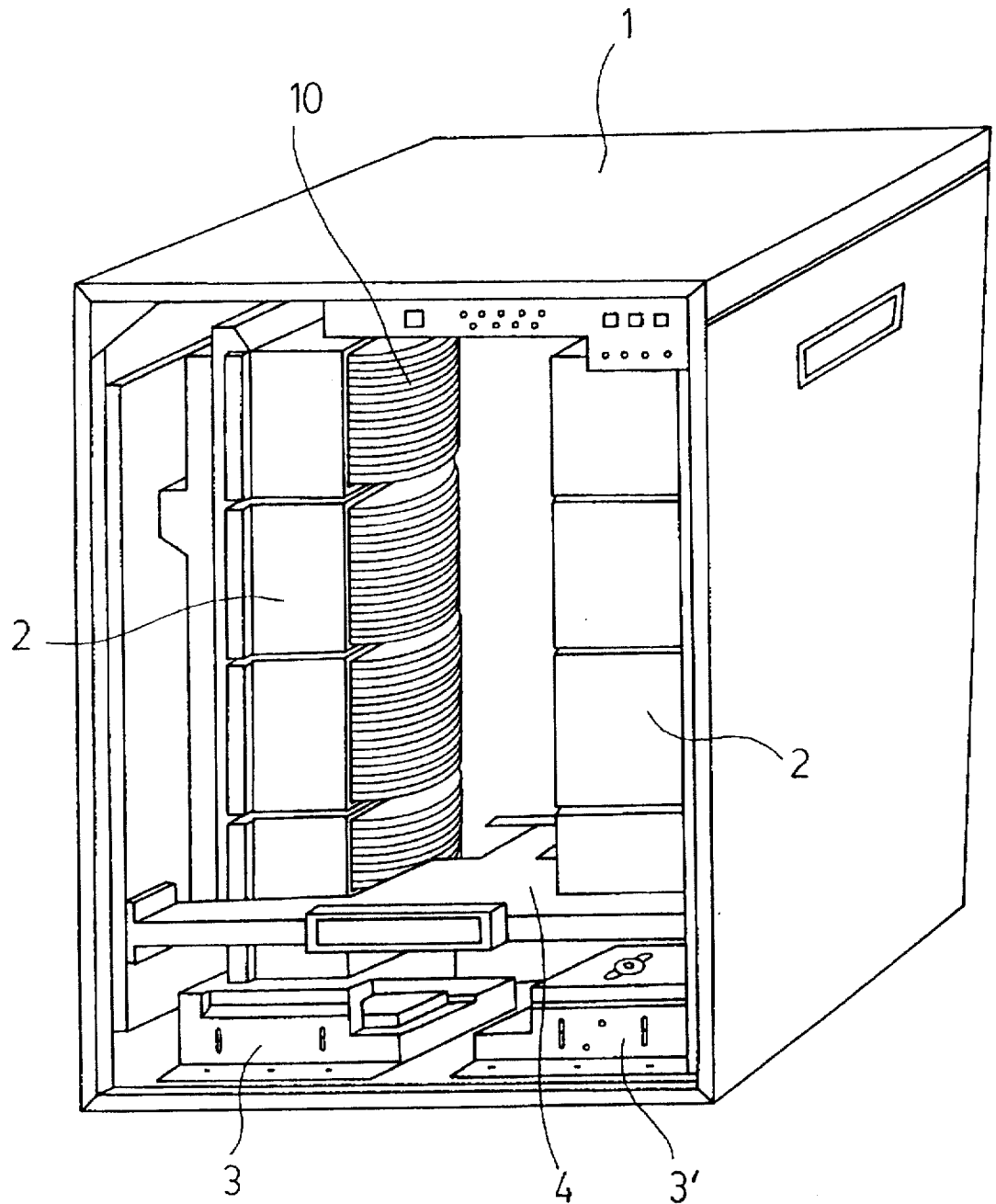
FIG. 1 is a perspective view showing a construction of a conventional autochanger used with an audio system or with a video system.
Figure 2:
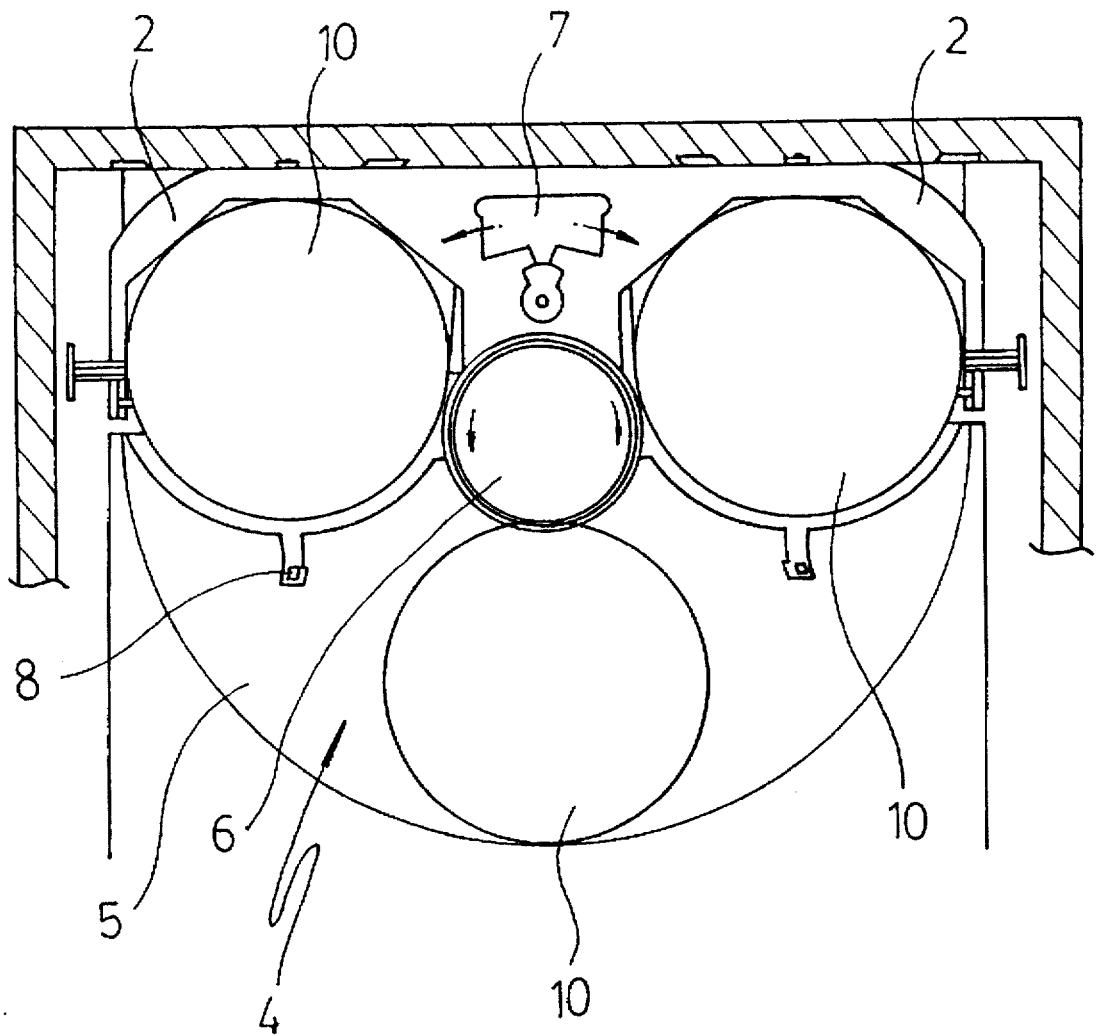
FIG. 2 is a schematic plan view of a disc feed mechanism of the autochanger of FIG. 1.

In FIG. 1 a conventional autochanger used with an audio system or with a video system is shown. The autochanger of the present invention includes four disc magazines 2 vertically placed on each side of the interior of the housing 1 in the same manner as described for the conventional autochanger. That is, the autochanger of this invention has eight magazines 2, each magazine 2 receiving and keeping forty-five compact discs 10 therein. The carrier 4 is movably placed in the interior of the housing 1 such that the carrier 4 vertically reciprocates in the center space defined between the magazines 2. The carrier 4 repeatedly automatically feeds and changes the discs 10 between the magazines 2 and the compact disc players 3 and 3'. The players 3 and 3' are placed under the disc magazines 2 in the interior of the housing 1.

Figure 3:
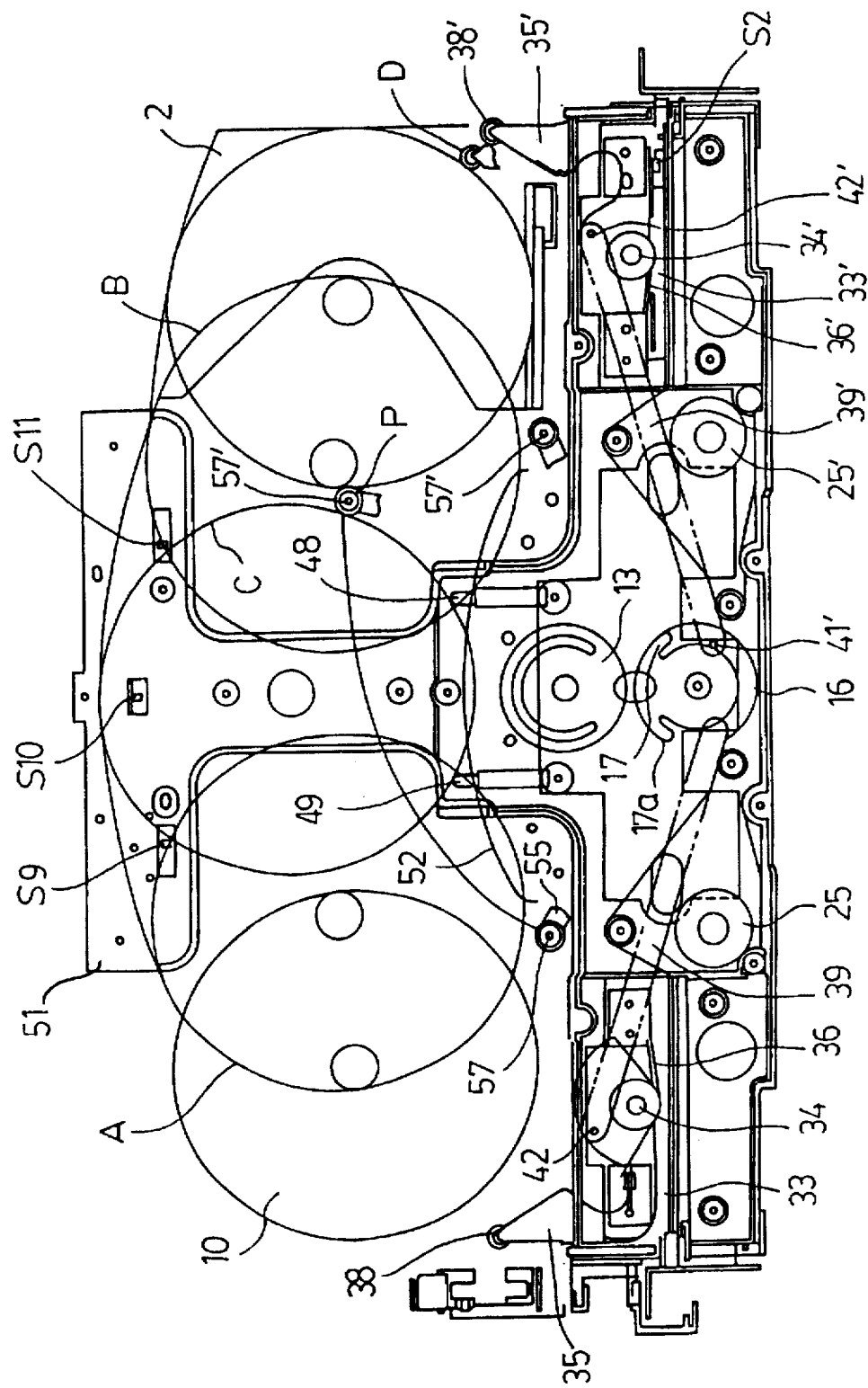
FIG. 3 is a plan view showing a disc feeding operation and a construction of a carrier of an autochanger in accordance with a first embodiment of the present invention.
Figure 4:
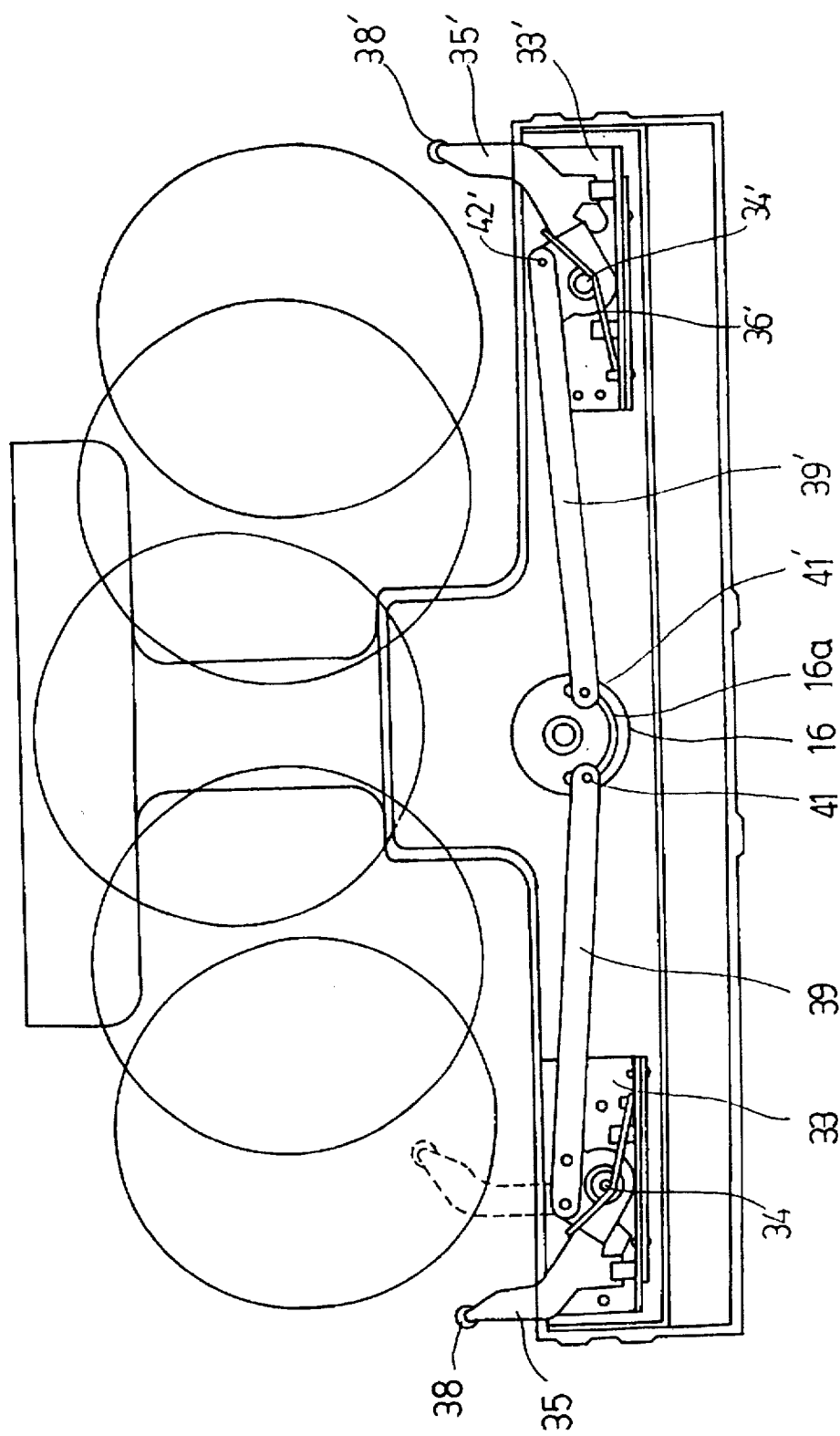
FIG. 4 is a plan view showing the relation between a lever drive cam and lever links of a disc feeding device according to the first embodiment of the invention.
Figure 5:
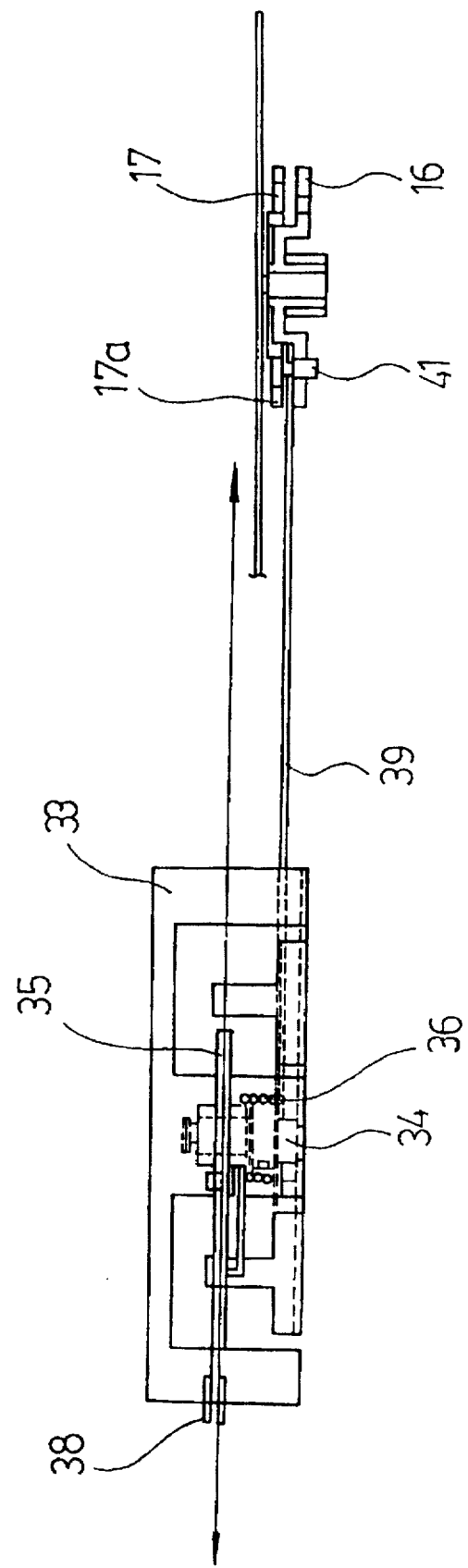
FIG. 5 is a front view of a lever unit of the carrier of the invention.

Referring next to FIGS. 3 to 5, FIG. 3 is a plan view showing both a disc feeding operation and a disc feeding mechanism of a carrier 4 in an autochanger in accordance with a first embodiment of the present invention, and FIGS. 4 and 5 are a plan view and a front view respectively showing a lever unit of a carrier 4 of FIG. 3. In the drawings, the reference numeral 16 denotes a lever drive cam and the numeral 17 denotes a disc holder drive cam. The cams 16 and 17 are applied with drive force from a lever drive motor 25 which will be described later herein.

With the lever drive cam 16, a pair of link arms, that is, a left link arm 39 and a right link arm 39' are pivoted to the cam 16 at their inside ends such that the link arms 39 and 39' are symmetrical to each other centering about the cam 16. The inside ends of the two link arms 39 and 39' are pivoted to the cam 16 through their pins 41 and 41' which are movably fitted in an arcuate pin hole 16a of the cam 16 as best seen in FIG. 4. The outside ends of the link arms 39 and 39' are pivoted to their associated levers 35 and 35' by pins 42 and 42'. The levers 35 and 35' are rotatable about their lever pins 34 and 34'.

Each of the levers 35 and 35' has an L-shaped configuration and is provided with a lever roller 38, 38' on one end thereof. The lever rollers 38, 38' are adapted for coming into contact with the edge of a disc 10. The other ends of the lever rollers 38 and 38' are pivoted to their associated lever brackets 33 and 33' through the lever pins 34 and 34' so that the levers 35 and 35' are turned about the lever pins 34 and 34' respectively. The levers 35 and 35' are biased by their lever springs 36 and 36' so that the levers 35 and 35' are biased to their return directions. Each of the springs 36 and 36' is a torsion spring which is fitted over the lever pin 34, 34' and leans on the lever 35, 35' and the bracket 33, 33' at both its arms.

Figure 6:
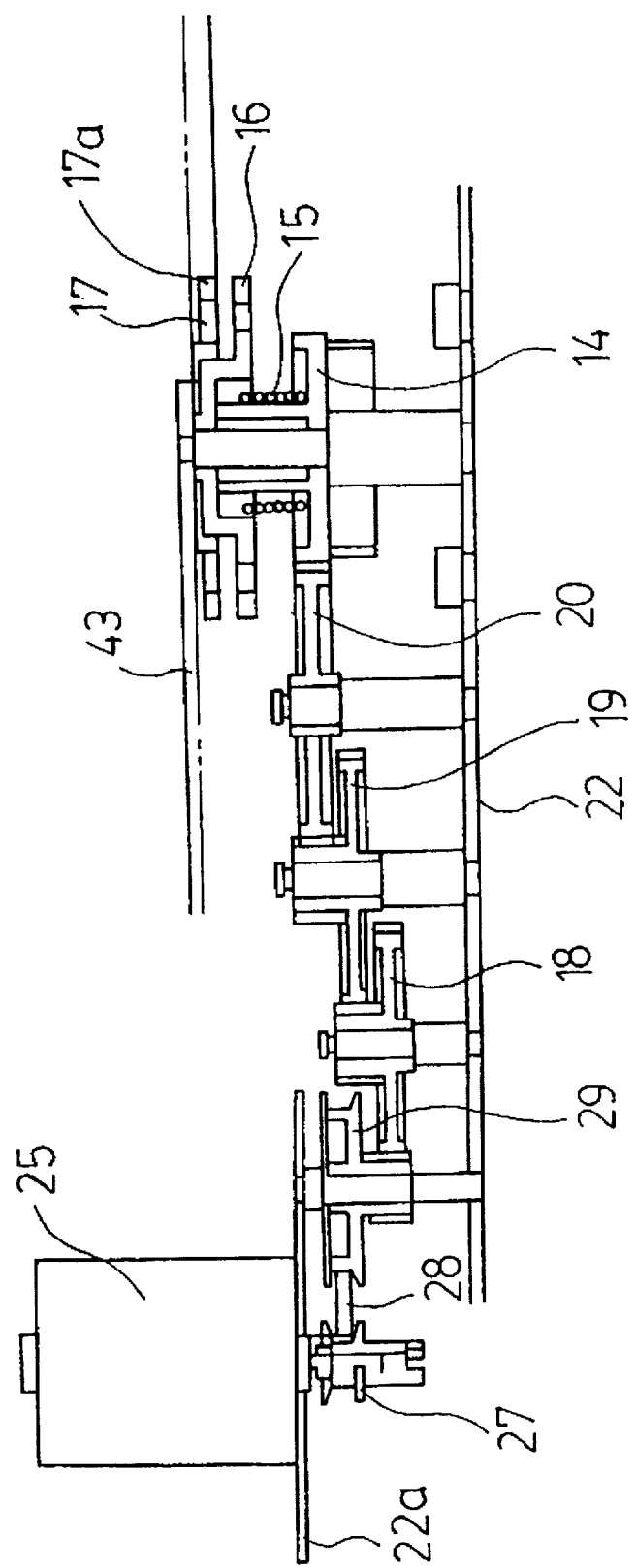
FIG. 6 is a front view of a drive unit of the carrier of the invention.

As shown in FIG. 6, a disc holder drive cam 17 is engaged with the top of the lever drive cam 16 so that the cams 16 and 17 are rotated together.

Hereinbelow, the drive force transmission mechanism for transmitting the drive force of motors to the lever unit and to the arm unit will be described with reference to FIGS. 6 to 9.

Figure 7:
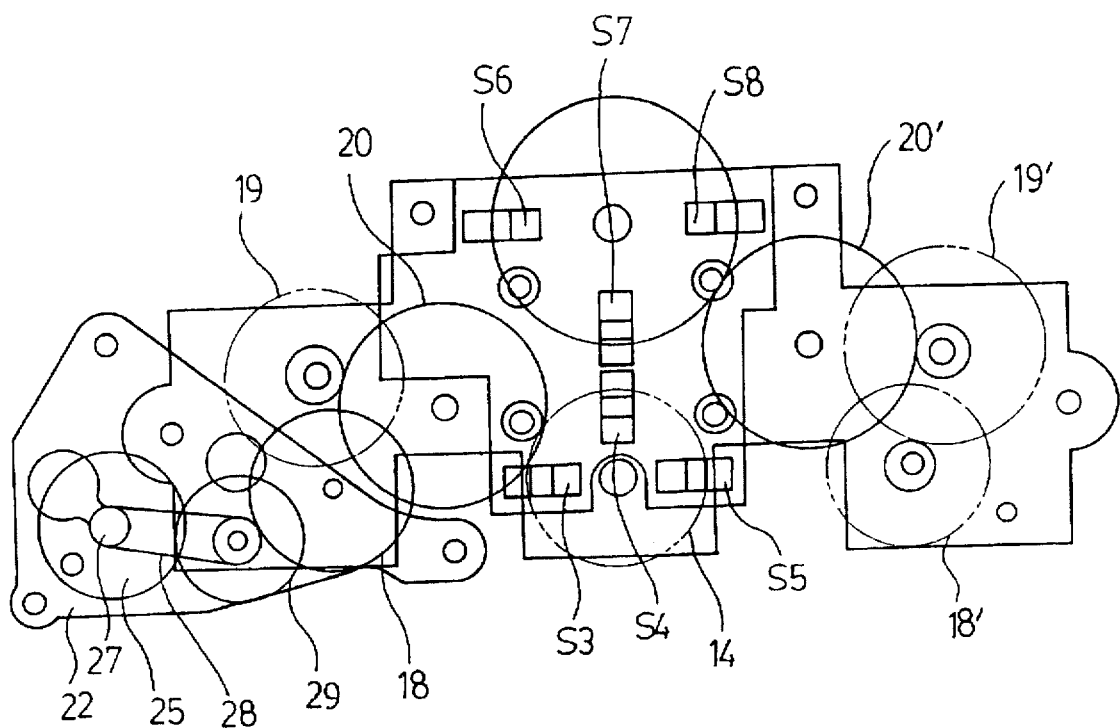
FIG. 7 is a schematic plan view showing the driving operation of the drive unit of the carrier of the invention.
Figure 8:
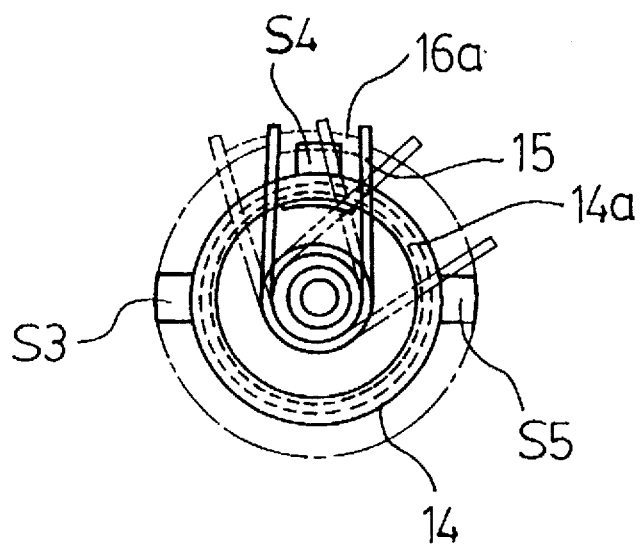
FIG. 8 is a plan view showing a lever drive cam spring mounted to a shaft of the lever drive cam of the invention.
Figure 9:
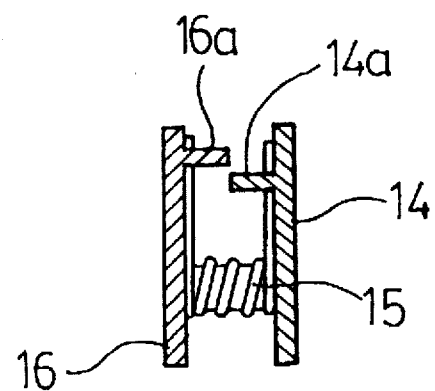
FIG. 9 is a side view of FIG. 8.

FIGS. 6 and 7 are a front view and a plan view respectively showing a drive unit of the carrier 4 of the autochanger. FIGS. 8 and 9 are a plan view and a side view respectively showing a lever drive cam spring 15 mounted to a lever drive cam shaft. As shown in the drawings, the lever drive motor 25 is mounted on the top surface of a bracket 22a which is fixed to the top of the carrier. In order to transmit the rotating force of the lever drive motor 25 to the lever drive cam 16 and to the disc holder drive cam 17, a first power transmission unit is movably mounted to a shaft of a chassis plate 22 of the carrier. The first power transmission unit includes a pulley block, a plurality of gears 18, 19 and 20 and a lever drive cam gear 14. The pulley block comprises a drive motor pulley 27, a timing belt 28 and a pulley 29.

In addition, a plurality of lever check sensors S3, S4 and S5 for sensing the lever motion are mounted to the bottom of the lever drive cam gear 14 as shown in FIG. 7.

The lever drive cam 16 and the disc holder drive cam 17 are mounted to the shaft of the lever drive cam gear 14. The lever drive cam spring 15, which is bent such that both of its ends are directed to its center as shown in FIG. 9, is provided between the lever drive cam 16 and the lever drive cam gear 14. Both ends of the lever drive cam spring 15 are, therefore, elastically supported by a first stopper 14a integrally formed on the surface of the lever drive cam gear 14 and by a second stopper 16a integrally formed on the surface of the lever drive cam 16. The two stoppers 14a and 16a are arranged such that they are parallel to each other.

Therefore, the rotating force of the lever drive cam gear 14 is transmitted to the second stopper 16a of the lever drive cam 16 through the lever drive cam spring 15 which is elastically supported by the first stopper 14a of the lever drive cam gear 14. Therefore, the lever drive cam gear 14 is rotated by the rotating force of the lever drive cam 16. That is, the spring force of the lever drive cam spring 15 is generated by the stopper 14a of the rotating lever drive cam gear 14 and transmitted to the lever drive cam 16 through the second stopper 16a of the lever drive cam 16. The spring force of the lever drive cam spring 15 moves the left and right levers 35 and 35'. When the left and right levers 35 and 35' are stopped at a predetermined position B of the carrier of FIG. 3, the load generated by the drive unit is absorbed by the spring force of the lever drive cam spring 15.

For example, even when the lever drive cam gear 14 is rotated somewhat past its intended stop position due to its inertia force when the autochanger is either stopped by the load caused by both the frictional force between the disc and the magazine and the contact force of the lever unit or stopped by the operational stop of the autochanger, the load which will be applied to the disc 10 is absorbed by the lever drive cam spring 15 thereby protecting the disc as well as the power transmission mechanism This facilitates motor control.

When the motor is stopped by the sensor after a disc feeding operation, the lever drive cam spring 15 applies its restoring force to the left and right lever drive cams which contact with the spring 15. Therefore, the lever drive cam spring 15 facilitates the disc feeding operation.

The arm drive motor 25' shown in FIG. 3 transmits its rotating force to an arm drive cam gear 11 through a second power transmission unit in the same manner as described for the lever drive motor 25. This unit includes a pulley mechanism (not shown) and a plurality of gears 18', 19' and 20'. An arm drive cam which will be described below is mounted to the rotating shaft of the arm drive cam gear 11.

Hereinbelow, the arm unit for feeding the disc 10 from the B position of the carrier of FIG. 3 to the center C of the carrier or from the center C to the magazine will be described with reference to FIGS. 10 to 13.

Figure 10:
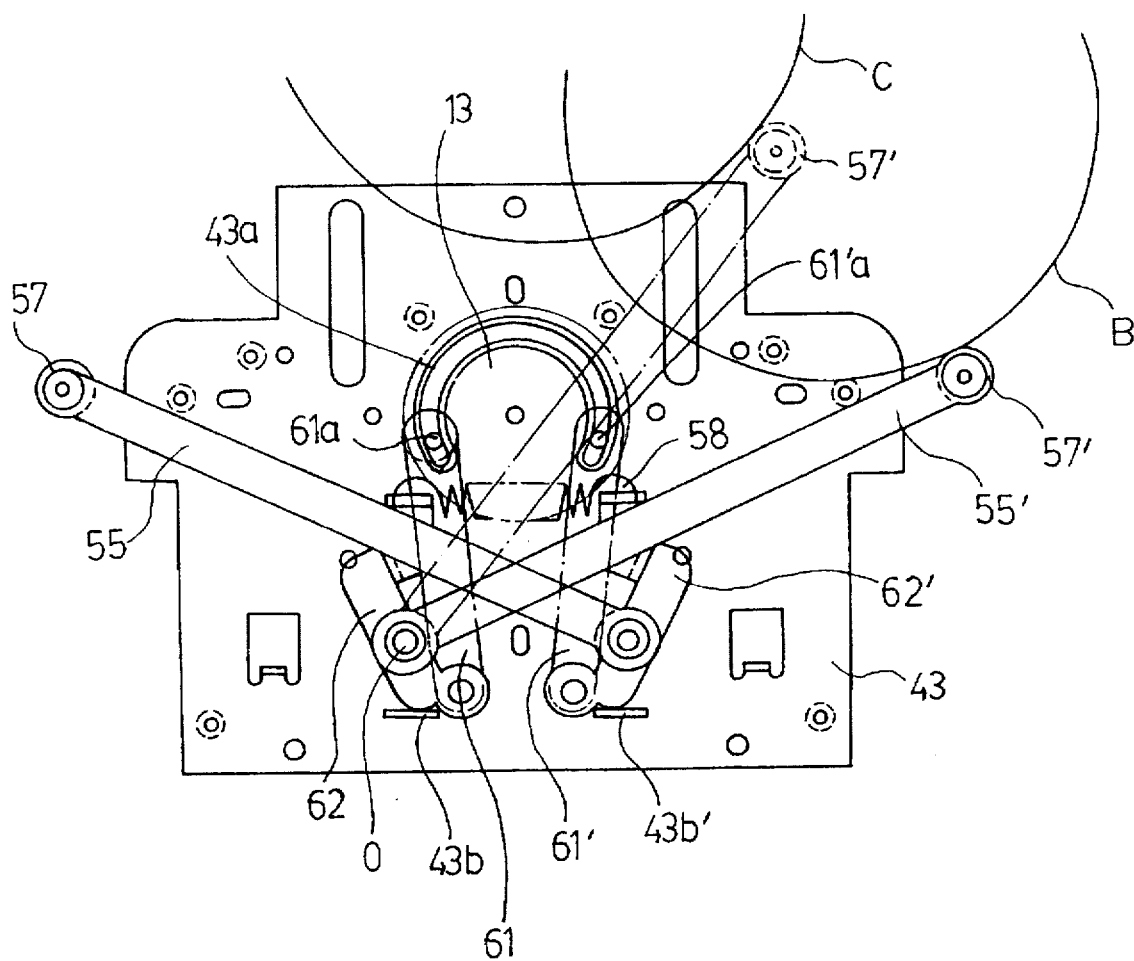
FIG. 10 is a plan view showing a disc feeding operation and a construction of the arm unit of the carrier of the invention.
Figure 11:
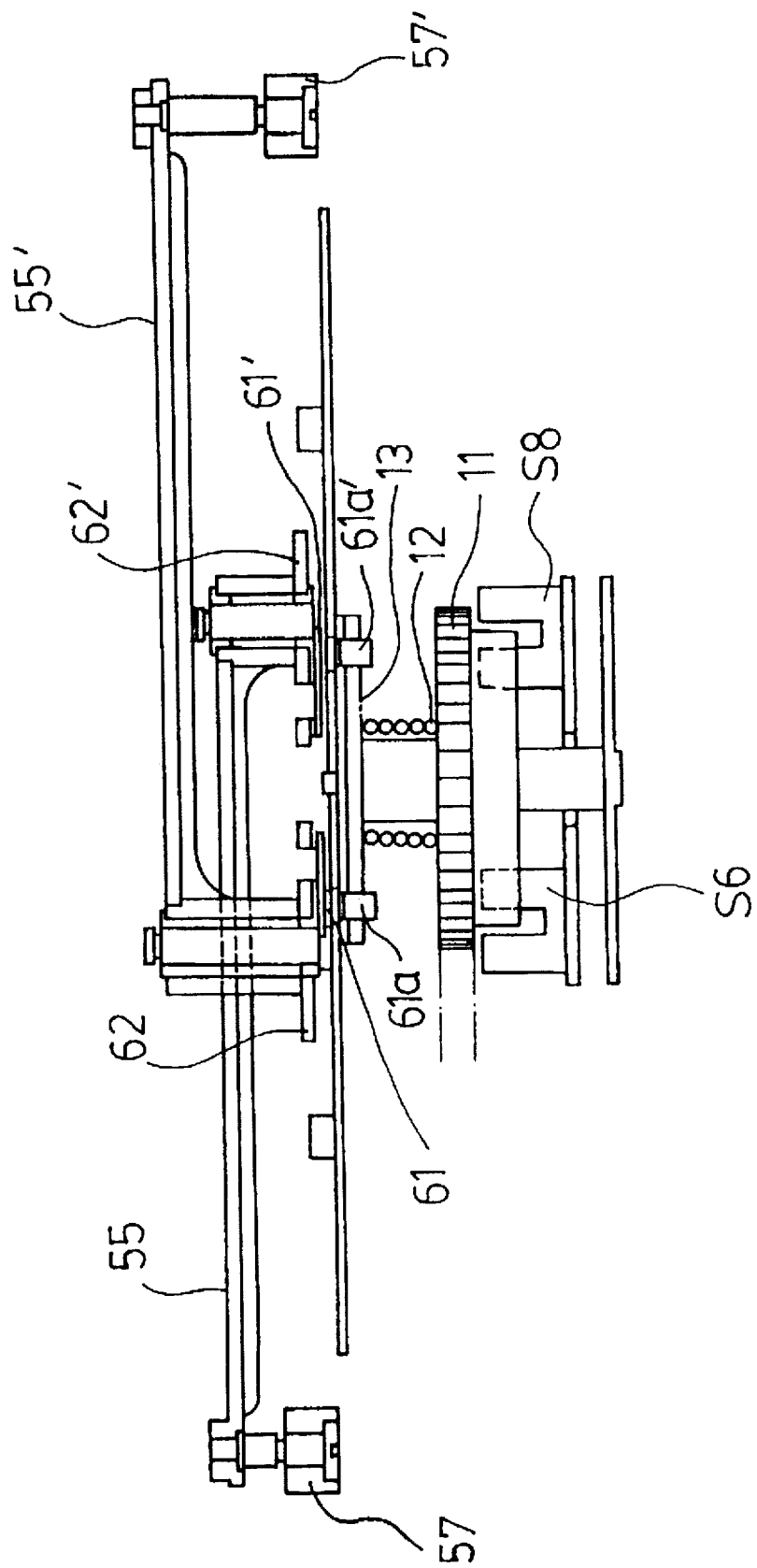
FIG. 11 is a side view of the arm unit of the carrier of the invention.
Figure 12:
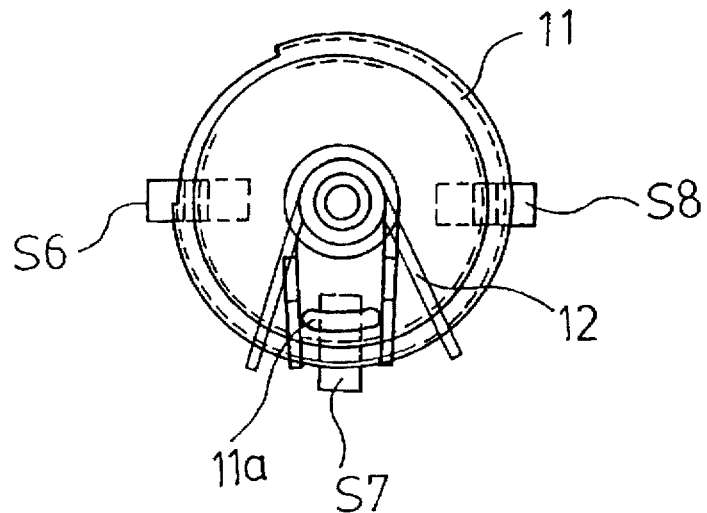
FIG. 12 is a plan view showing an arm drive cam spring mounted to a shaft of the arm drive cam of the invention.
Figure 13:
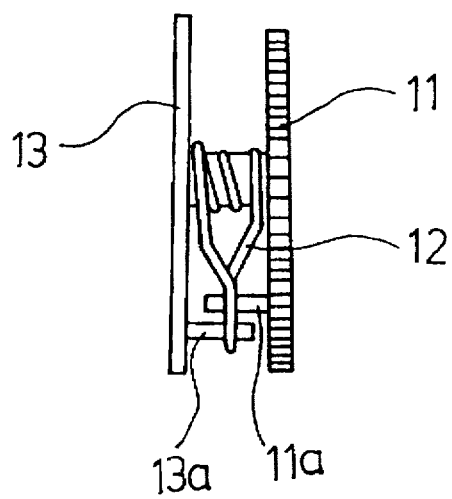
FIG. 13 is a side view of FIG. 12.

FIGS. 10 and 11 are a plan view and a front view respectively showing the arm unit of the carrier, and FIGS. 12 and 13 are a plan view and a side view respectively showing an arm drive cam spring 12 mounted to the rotating shaft of the arm drive cam.

The rotating force of the arm drive motor 25' of the above described drive unit is transmitted to the arm drive cam gear 11 as shown in FIG. 11. The drive cam 13 is mounted to the shaft of the arm drive cam gear 11, and the arm drive cam spring 12 is provided between the arm drive cam 13 and the arm drive cam gear 11.

As shown in FIG. 10, the arm drive cam 13 is mounted to the bottom surface of an arm frame bracket 43. The bracket 43 is provided with a circular cam hole 43a.

A pair of first arm links, that is, a left link 61 and a right link 61', are pivoted to the arm drive cam 13 at their inside ends such that the links 61 and 61' are symmetrical to each other. In this case, the inside ends of the two links 61 and 61' are pivoted to a semicircular cam hole 43a of the cam 13 with their cam hole pins 61a and 61a' as best seen in FIG. 10. The outside ends of the links 61 and 61' are pivoted to the arm bracket 43. In addition, a pair of second arm links 62 and 62' are pivoted to the arm bracket 43 such that the second links 62 and 62' are seesawed under the condition that the second links 62 and 62' are positioned relative to the first links 61 and 61' at a predetermined angle.

The movements of the second arm links 62 and 62' are limited by their associated arm stoppers 43b and 43b' provided on the arm frame bracket 43.

A coil spring 58 is connected to the outside ends of the second arm links 62 and 62' so that the arm links 62 and 62' are provided with a restoring force. The second arm links 62 and 62' are also linked at their middle portions to left and right arms 55 and 55'. The arms 55 and 55' are pivoted to the arm bracket 43 such that the arms 55 and 55' are turned clockwise and counterclockwise respectively. Therefore, the arm links 62 and 62' and the arms 55 and 55' are turned at the same time. The free ends or the outside ends of the arms 55 and 55' are provided with arm rollers 57 and 57' respectively. The rollers 57 and 57' come into contact with the disc 10. Therefore, the arm rollers 57 and 57' are selectively rotated in accordance with the rotating direction of the arm drive cam 13.

For example, when the arm drive cam 13 is rotated clockwise, the first arm link 61 is lifted and the second arm link 62 is rotated counterclockwise. Therefore, the arm roller 57' is rotated counterclockwise as shown at the dotted line of FIG. 10. This feeds the disc from position B to position C. Meanwhile, when the arm drive cam 13 is rotated counterclockwise, the arm roller 57 is rotated clockwise.

As shown in FIG. 13, the arm drive cam spring 12 is provided between the arm drive cam 13 and the arm drive cam gear 11. The arm drive cam spring 12 is elastically stopped by a stopper 11a of the arm drive cam gear 11 and by a stopper 13a of the arm drive cam 13. The two stoppers 11a and 13a are arranged such that the stoppers 11a and 13a are parallel to each other.

In addition, a plurality of arm check sensors S6, S7 and S8 for sensing the arm motion are mounted to the bottom of the arm drive cam gear 11.

When the arm drive cam gear 11 is rotated, the arm drive cam 13 is rotated by the arm drive cam spring 12 as shown in FIG. 12. Therefore, when the left and right arms 55 and 55' of FIG. 10 are stopped at a predetermined position C due to the spring force of the arm drive cam spring 12, the load generated by the drive unit is absorbed and removed by the arm drive cam spring 12.

For example, even when the arm drive cam gear 11 is rotated somewhat over its intended stop position due to its inertia force when the autochanger is stopped by the load caused by both the frictional force between the disc and the magazine and the contact force of the arm unit, or stopped by the operational stop of the autochanger, the load which will be applied to the disc 10 is absorbed by the arm drive cam spring 12 and thereby protects the disc as well as the power transmission mechanism and facilitates motor control.

When the motor is stopped by the sensor after a disc feeding operation, the arm drive cam spring 12 applies its restoring force to the left and right arm drive cams which contact the spring 12. Therefore, the arm drive cam spring 12 facilitates the disc feeding operation of the autochanger.

Figure 14:
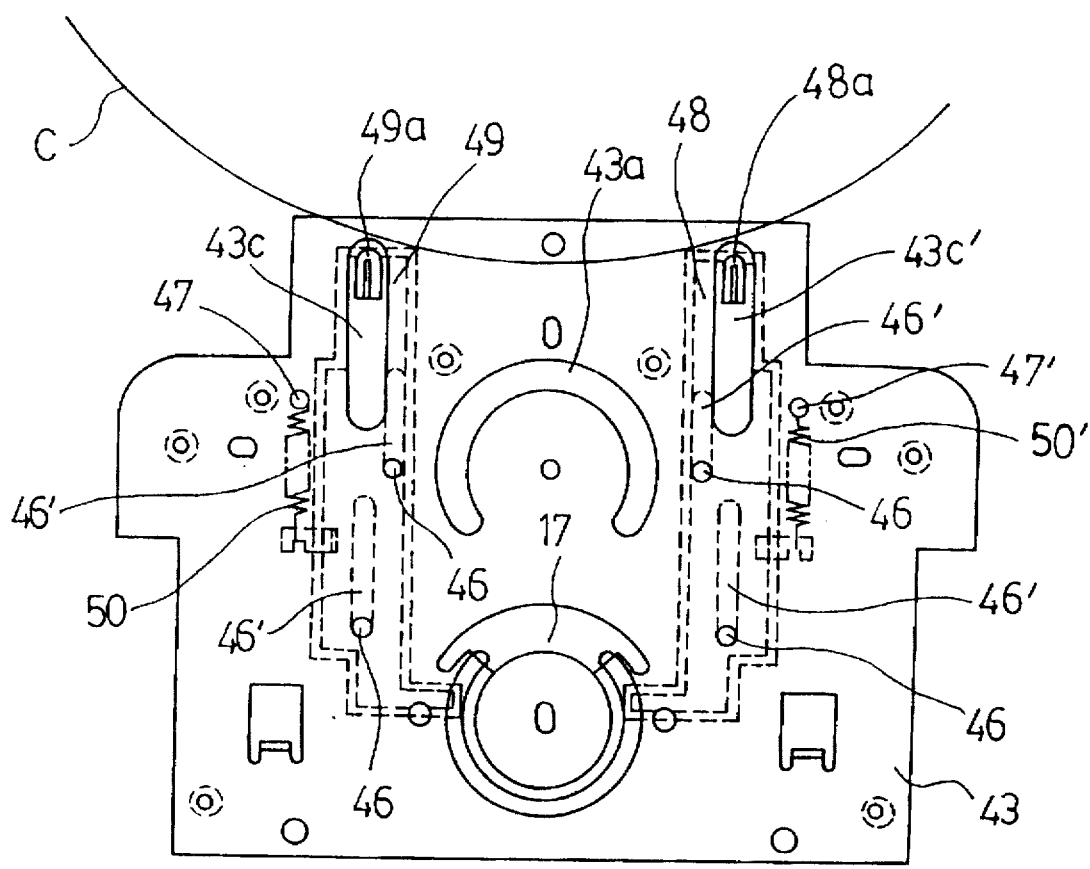
FIG. 14 is a plan view of a disc holder unit of the carrier of the invention.
Figure 15:
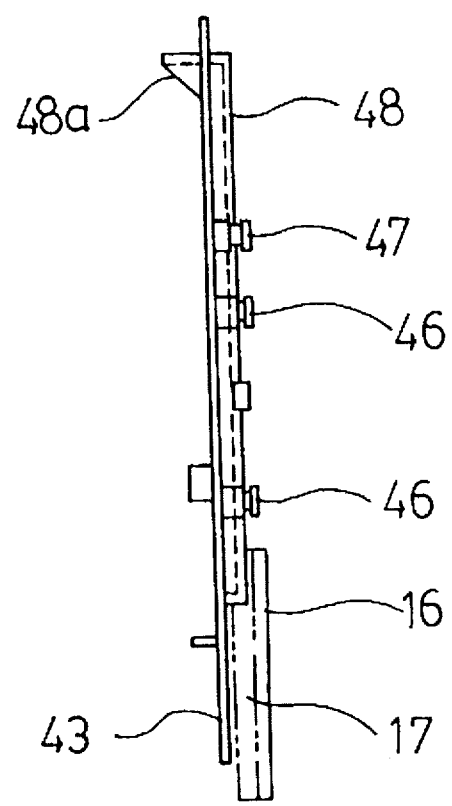
FIG. 15 is a side view of a disc holder unit of the carrier of the invention.
Figure 16:
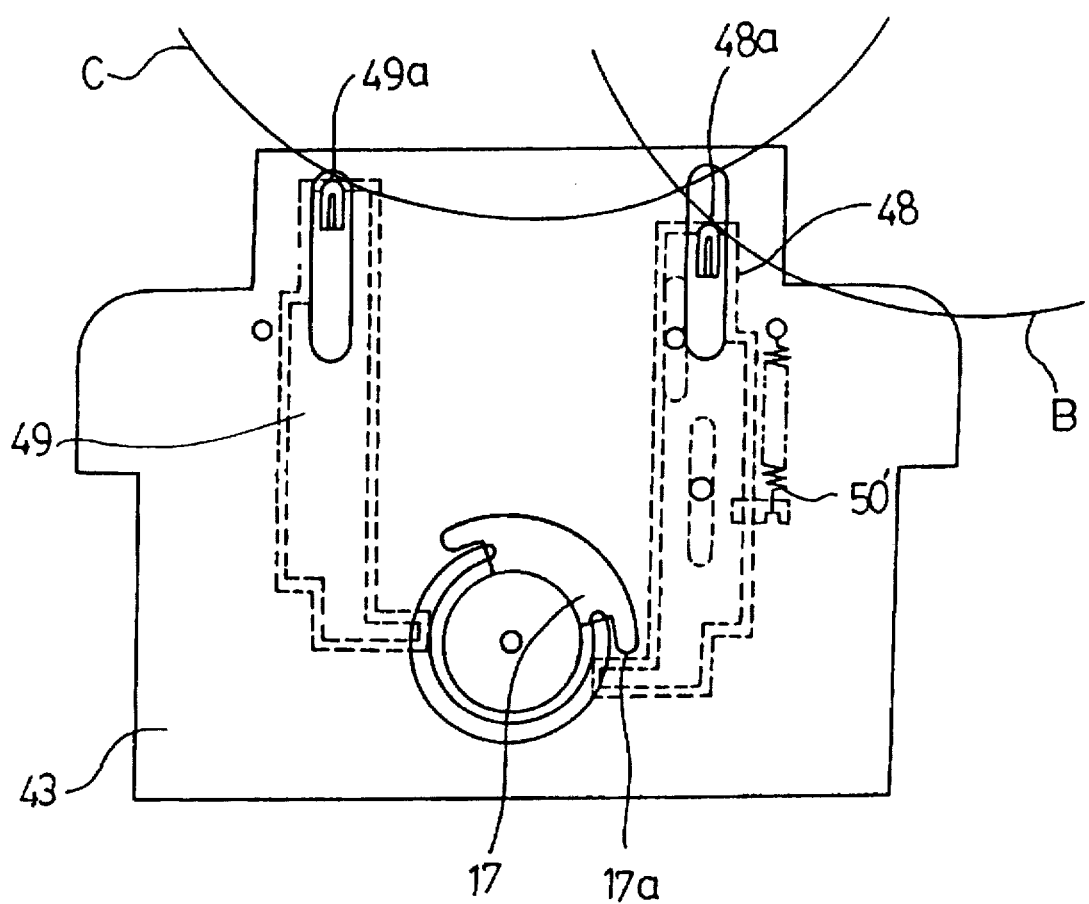
FIG. 16 is a plan view showing the motion of the disc holder when the disc is moved from position B to position C of the carrier of the invention.

Hereinbelow, the disc holder unit will be described in detail with reference to FIGS. 14 and 15. FIGS. 14 and 15 are a plan view and a side view showing the disc holder unit of the carrier and FIG. 16 is a plan view showing the disc holder when feeding the disc to position B and to position C.

As shown in FIG. 6, the lever drive cam 16 and the disc holder drive cam 17 are mounted to the shaft of the lever drive cam gear 14. The rotating force of the lever drive motor 25 is applied to the shaft of the lever drive cam gear 14. Two symmetric disc holders 48 and 49 are mounted to the disc holder drive cam 17 as shown in FIGS. 16 and 14.

Each of the two disc holders 48 and 49 is provided with two slots 46' so that each disc holder 48, 49 is slidable with a predetermined stroke with respect to the horizontal plan of the arm frame bracket 43. A fixing pin 46 is received in each slot 46' and guides movement of the disc holder.

The front ends of the disc holders 48 and 49 are provided with their tips 48a and 49a which contact the disc so that the disc holders 48 and 49 keep the disc in a place when the disc has been fed to the center of the carrier. The tips 48a and 49a of the disc holders 48 and 49 extend through the through holes 43c of the arm frame bracket 43 such that the tips 48a and 49a protrude out of the through holes 43c and can come into contact with the edge of the disc.

The disc holders 48 and 49 are provided with holder springs 50 and 50' respectively. These springs 50 and 50' are adapted for returning the disc holders 48 and 49 to their original positions.

In the above disc holder unit, the disc holders 48 and 49 are selectively moved in accordance with the rotating direction of the disc holder drive cam 17. That is, when the disc 10 is fed from the magazine to position B by the lever of the lever drive cam 17 as shown in FIG. 16, the lever drive cam 17 is rotated clockwise and moves down the disc holder 48 so that the disc can be moved to position B.

The disc, which has been fed to position B of the carrier, in turn is fed to position C by the arm rollers 57 of FIG. 10. When feeding the disc from position B to position C, the disc holder 49 prevents sudden separation of the disc while the other disc holder 48 moves upward and pushes the disc so that the disc is seated on the center of the carrier.

Figure 18:
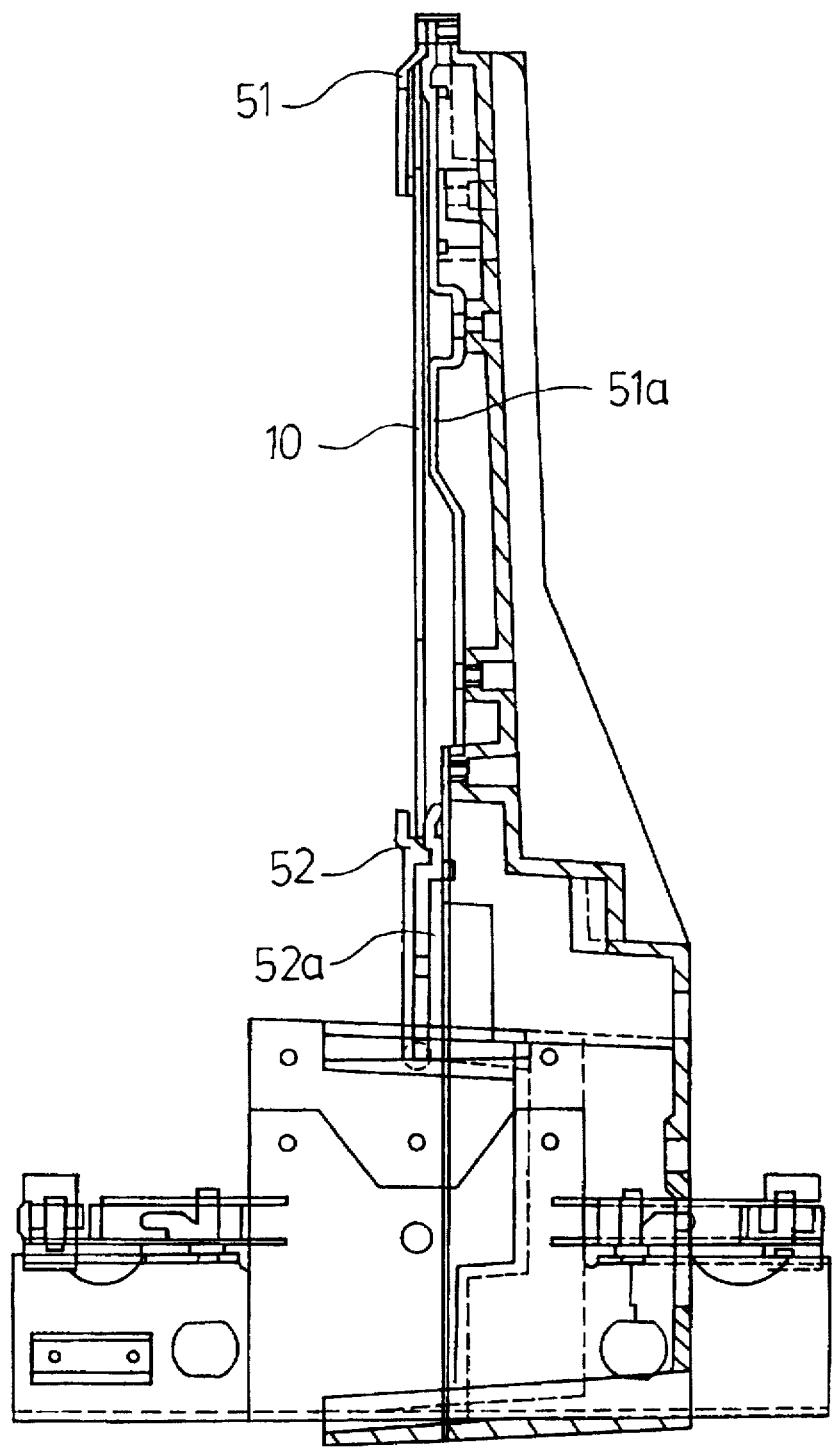
FIG. 18 is a sectional view of the guide rail unit of the carrier of the invention.

Hereinbelow, the guide rail unit will be described in detail with reference to FIGS. 17 and 18. FIGS. 17 and 18 are a plan view and a side view showing the guide rail unit of the carrier.

As shown in FIGS. 17 and 18, a top disc rail 51 and a bottom disc rail 51a are formed into curved rails having a predetermined curvature and tapered at their portions where the disc rails contact the disc fed by the carrier.

The guide rail unit includes a holder rail comprising a top holder rail 52 and a bottom holder rail 52a. The holder rails 52 and 52a are placed relative to the top and bottom disc rails 51 and 51a with predetermined intervals. The top and bottom holder rails 52 and 52a are formed into curved rails having a curvature the same or similar to the curvature of the disc rails. Each of the holder rails 52 and 52a is also provided with points of deflection at both of its ends and tapered at the portion where each holder rail comes into contact with the disc.

As the holder rails 52 and 52a are formed so as to have their tapered portions as described above, both surfaces of the disc are fed under the condition of linear contact so that the load is minimized and the disc is scarcely damaged during the disc feeding operation.

A printed circuit board (PCB) 70 is provided with a plurality of disc check sensors S9, S10 and S11 for checking if the disc is fed to position B and to position C. The PCB 70 is mounted to the bottom of the disc rail 51.

The above PCB 70 is provided on the top surface of the front end of the bottom disc rail 51' so that the PCB 70 checks the positional state of the disc moving between the top and bottom disc rails 51 and 51' and outputs an electric signal indicative of the checking result to a controller.

Hereinbelow, the disc feeding operation of the above disc feeding device of the first embodiment will be described.

First, a disc feeding operation for feeding the disc from a right magazine to the center C of the carrier will be described. The disc feeding operation for feeding the disc from the right magazine to the center C of the carrier is equal to a disc feeding operation for feeding the disc from the right-side disc player to the center C of the carrier. In addition, a disc feeding operation for feeding the disc from the left magazine to the center C of the carrier or for feeding the disc from the left-side disc player to the center C of the carrier will be achieved simply by reversing the rotating direction of the drive motor. The above disc feeding operations are same as each other in their operational processes as well as in their operational effects.

When the rotating force of the lever drive motor 25 is transmitted to the lever drive cam 16 and the disc holder drive cam 17 through the pulley unit (the pulley unit including the motor pulley 27, the timing belt 28 and the drive pulley 29) and through the plurality of gears 18, 19, 20 and 14, both cams 16 and 17 are rotated clockwise. This rotation is caused by the rotating force of the lever drive motor 25. Therefore, the disc holder drive cam 17 moves the right disc holder 48 downward and, at the same time, the lever drive cam 16 moves the right link arm 39' and rotates the right lever 35' so that the right lever 35' rolls and feeds the disc of the right magazine to position B of the carrier.

At this time, as shown in FIG. 8, the signals of the lever check sensors S3, S4 and S5 in the home positions are changed from OFF, ON and OFF to ON, OFF and ON respectively, thereby stopping the lever drive motor 25. At this position, the disc check sensor S11 senses the disc, that is, the signal of the sensor S11 is changed from ON to OFF.

After the lever drive motor 25 is stopped, the rotating force of the arm drive motor 25' is transmitted to the arm drive cam 13 and rotates the cam 13 clockwise. Therefore, the left link 61 is moved as shown in FIG. 10 so that the arm 55' is rotated centering about the zero point and pushes the disc such that the disc is rolled and fed from position B to the center of the carrier.

At this time, as shown in FIG. 3, the signals of the disc check sensors S11, S10 and S9 are changed from OFF, ON and ON to ON, OFF and ON respectively, thereby stopping the arm drive motor 25'.

After the arm drive motor 25' is stopped, the lever drive motor 25 is rotated so that the lever drive cam 16 and the disc holder drive cam 17 are rotated counterclockwise. Therefore, the lever 35' and the right disc holder 48 are moved to their home positions.

When the signals of the lever check sensors S3, S4 and S5 are changed from ON, ON and OFF to OFF, ON and OFF respectively, as shown in FIG. 3, after a home position sensor S2 which is mounted to the bottom of the home position of the lever 35' is changed from ON to OFF, the lever drive motor 25 is stopped.

When the right disc holder 48 returns to the home position, the disc holder 48 pushes the disc so as to allow the disc to be positioned on the center of the carrier. In this case, the disc is supported by the left and right disc holders so that the disc is precisely positioned on the center of the carrier.

After the lever drive motor 25 is stopped, the arm drive cam 13 is rotated counterclockwise by the rotating force of the arm drive motor 25'. When the signals of the arm check sensors S6, S7 and S8 in the home positions are changed to OFF, ON and OFF as shown in FIG. 12, the arm drive motor 25' is stopped.

After the above process has been finished, the disc is positioned on the center of the carrier and, in this state, the carrier vertically reciprocates under the control of the controller.

In the above description, the disc feeding operation for feeding the disc from the left or right magazine or from the left or right compact disc player to the center of the carrier has been described. Hereinbelow, a disc feeding operation for feeding the disc from the center of the carrier to the left or right magazine or to the left or right compact disc player will be described.

The disc feeding operation for feeding the disc from the center C of the carrier to the right magazine is equal to a disc feeding operation for feeding the disc from the center C of the carrier to the right-side disc player. In addition, a disc feeding operation for feeding the disc from the center C of the carrier to the left magazine or to the left-side disc player will be achieved simply by reversing the rotating direction of the drive motor. The above disc feeding operations are same as each other in their operational processes as well as in their operational effects.

Therefore, the disc feeding operation for feeding the disc from the center of the carrier to the right magazine will be described hereinbelow.

When the rotating force of the lever drive motor 25 is transmitted to the lever drive cam 16 and to the disc holder drive cam 17 and rotates the cams 16 and 17 clockwise, the disc holder drive cam 17 moves the right disc holder 48 downward and, at the same time, the lever drive cam 16 moves the right link arm 39' and rotates the right lever 35'.

When the lever home position sensor S2 is changed from the home position to the position D, or changed from OFF to ON, the right lever 35' is stopped.

After the lever drive motor 25 is stopped, the rotating force of the arm drive motor 25' is transmitted to the arm drive cam 13 and rotates the cam 13. Therefore, the left arm 55 is rotated to the point P which pushes the disc such that the disc is rolled and fed from the center of the carrier to the right magazine.

At this time, the signals of the arm check sensors S6, S7 and S8, as shown in FIG. 12, are changed from OFF, ON and OFF to ON, ON and OFF respectively, thereby stopping the arm drive motor 25'.

After the arm drive motor 25' is stopped, the lever drive motor 25 and the arm drive motor 25' are rotated reversely so that the levers, the disc holders and the arms are returned to their home positions respectively. After this the carrier vertically reciprocates under the control of the controller.

The carrier of the autochanger having the above construction according to the first embodiment of the invention has a simple construction and feeds the disc through a rolling motion, thus minimizing possible disc damage and easily and precisely controlling position of the disc using a small number of sensors.

Figure 19:
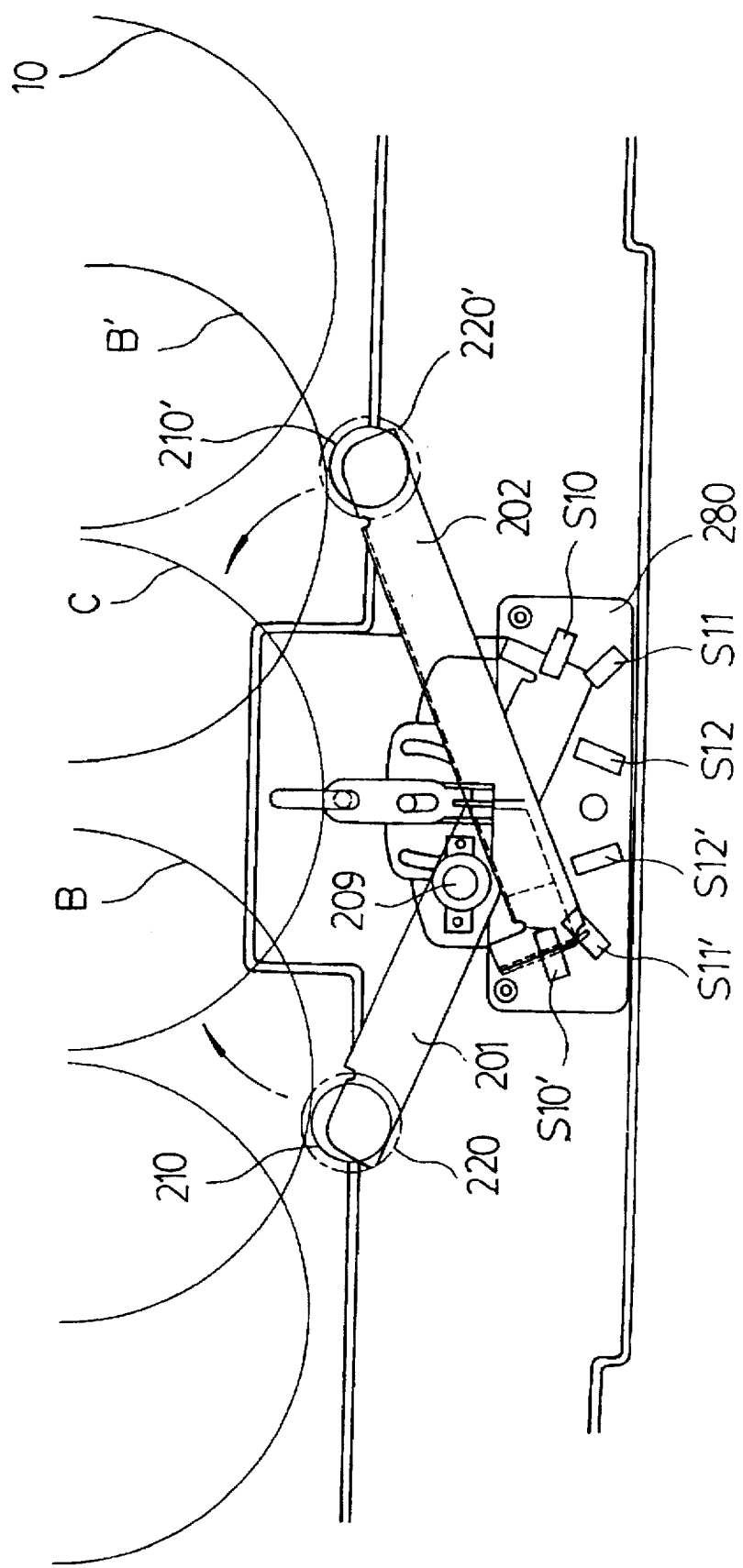
FIG. 19 is a plan view showing a feeding operation and a construction of an arm unit of a carrier of an autochanger in accordance with a second embodiment of the invention.
Figure 20:
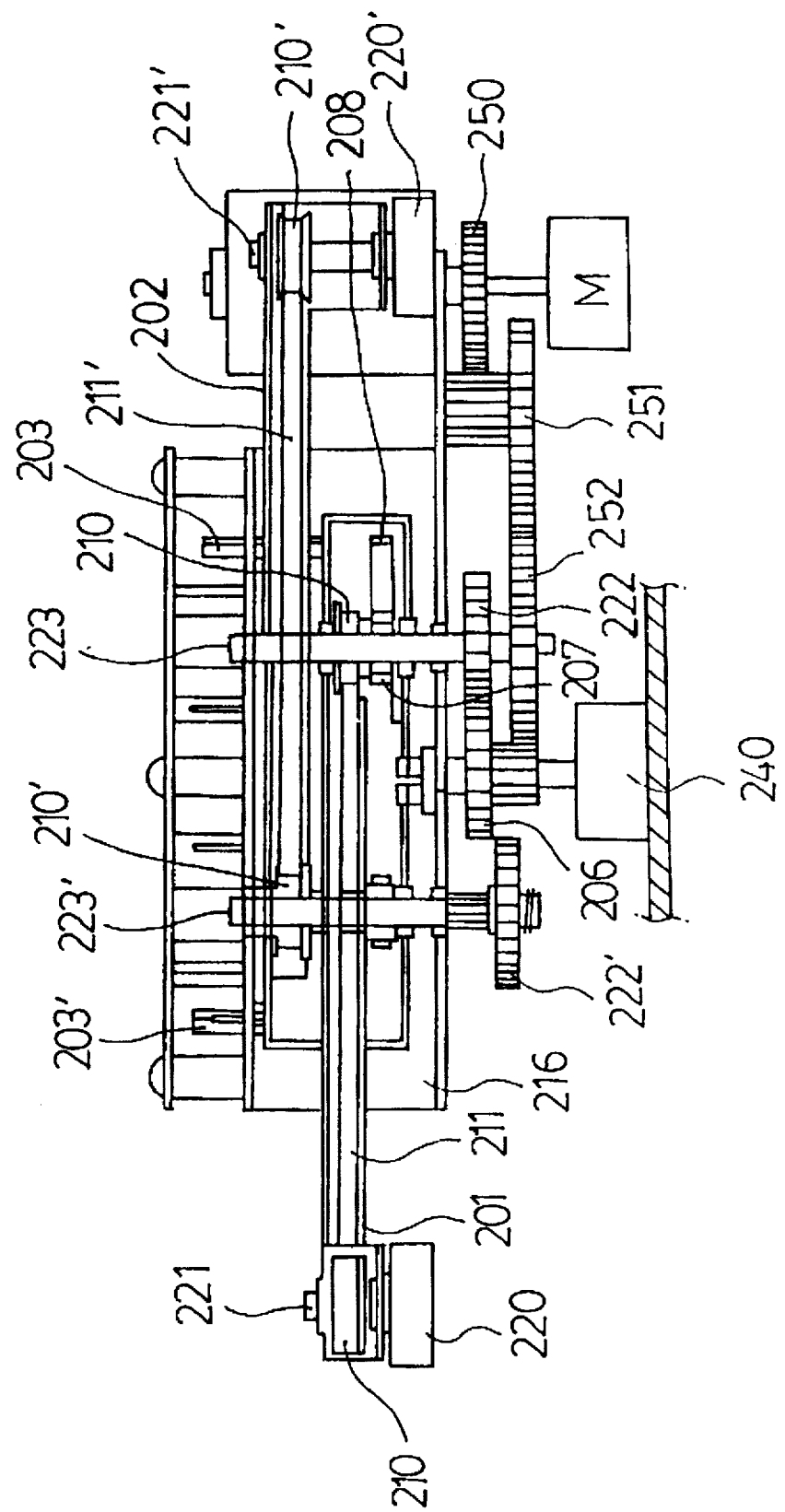
FIG. 20 is a front view of the arm unit of the carrier of FIG. 19.

Turning to FIGS. 19 and 20, there is shown a disc feeding device of an autochanger in accordance with a second embodiment of the invention. In the second embodiment, both the driving type and the construction of the arm unit of the carrier are different from those of the first embodiment.

FIG. 19 is a plan view showing the arm unit of the carrier and FIG. 20 is a sectional view of the arm unit. As shown in FIGS. 19 and 20, the arm unit of the second embodiment includes a left arm 201 and a right arm 202 in the same manner as described for the first embodiment. The front ends of the arms 201 and 202 are provided with rotatable arm rollers 220 and 220' respectively. The arms 201 and 202 cross each other and are placed at a height such that the arms 201 and 202 do not interfere with each other. The arm rollers 220 and 220' of the arms 201 and 202 are placed in the same horizontal line.

The arm rollers 220 and 220' are adapted for relieving the impact generated when the arms come into contact with the edge of a disc. The arm rollers 220 and 220' are also rotated in order to roll and feed the disc when the arms are overloaded during their horizontal movement. The arm unit of the second embodiment is characterized in that it additionally includes means for transmitting the rotating force in order to apply the rotating force to the arm rollers 220 and 220'.

The cross sectional area of each of the left and right arms 201 and 202 has a U-shaped configuration so that each arm 201 or 202 defines a space therein. The arms 201 and 202 receive in their spaces first timing pulleys. These pulleys rotate along with their associated long shafts 223 and 223'. The spaces in the arms 201 and 202 also receive timing belts 211 and 211'. These timing belts 211 and 211' are wrapped about the first timing pulleys and transmit the rotating force of the timing pulleys. The front ends of the arms 201 and 202 are provided with second timing pulleys 210 and 210'. These pulleys 210 and 210' have the rotating force of the long shafts 223 and 223' applied to them through the timing belts 211 and 211'. The front ends of the arms 201 and 202 are also provided with the arm rollers 220 and 220' respectively. These rollers 220 and 220' are mounted to the arm roller shafts 221 and 221' and cooperate with the second timing pulleys 210 and 210' respectively.

The long shafts 223 and 223' are provided with guide gears 207 and 207'. These gears 207 and 207' gear into idle gears 208 and 208' respectively. The idle gears 208 and 208' in turn gear into the oil damper gears 209 and 209+ of FIG. 19 respectively.

When the arms 201 and 202 are overloaded during movement, they will be stopped or moved very slowly. However, the oil damper gears 209 and 209' rotate the timing pulleys 210 and 210' and the timing belts 211 and 211', thus rotating the arm rollers 221 and 221' and doubling the disc feeding force.

In FIG. 20, the rear ends of the left and right arms 201 and 202 are provided with sensing members 203 and 203. These sensing members 203 and 203' extend to the top of the chassis plate 216 and are adapted for sensing the rotating angles of the arms 201 and 202 respectively.

A plurality of sensors S10, S11, S12, S10', S11' and S12' for sensing the rotating states of the sensing members 203 and 203' are mounted on a sensor mount 280 provided on the top surface of the chassis plate 216.

Of the above sensors, the sensors S10 and S10' are adapted for sensing the stop positions of the arms 201 and 202. The sensors S11 and S11' are adapted for sensing the arm positions when the disc reaches position B. The sensors S12 and S12' are adapted for sensing the arm positions when the disc reaches position C.

The ends of the long shafts 223 and 223' of the left and right arms 201 and 202 are provided with first and second gears 222 and 222. These gears 222 and 222' are positioned at different heights such that the rotating force of a positional variable gear 206 is applied to the gears 222 and 222'. The variable gear 206 is mounted to a shaft of a variable drive member 240. This drive member 240 is controlled by the controller and vertically reciprocates in response to an electric signal. In the present invention, it is preferred to use a solenoid as the above variable drive member 240.

Figure 21:
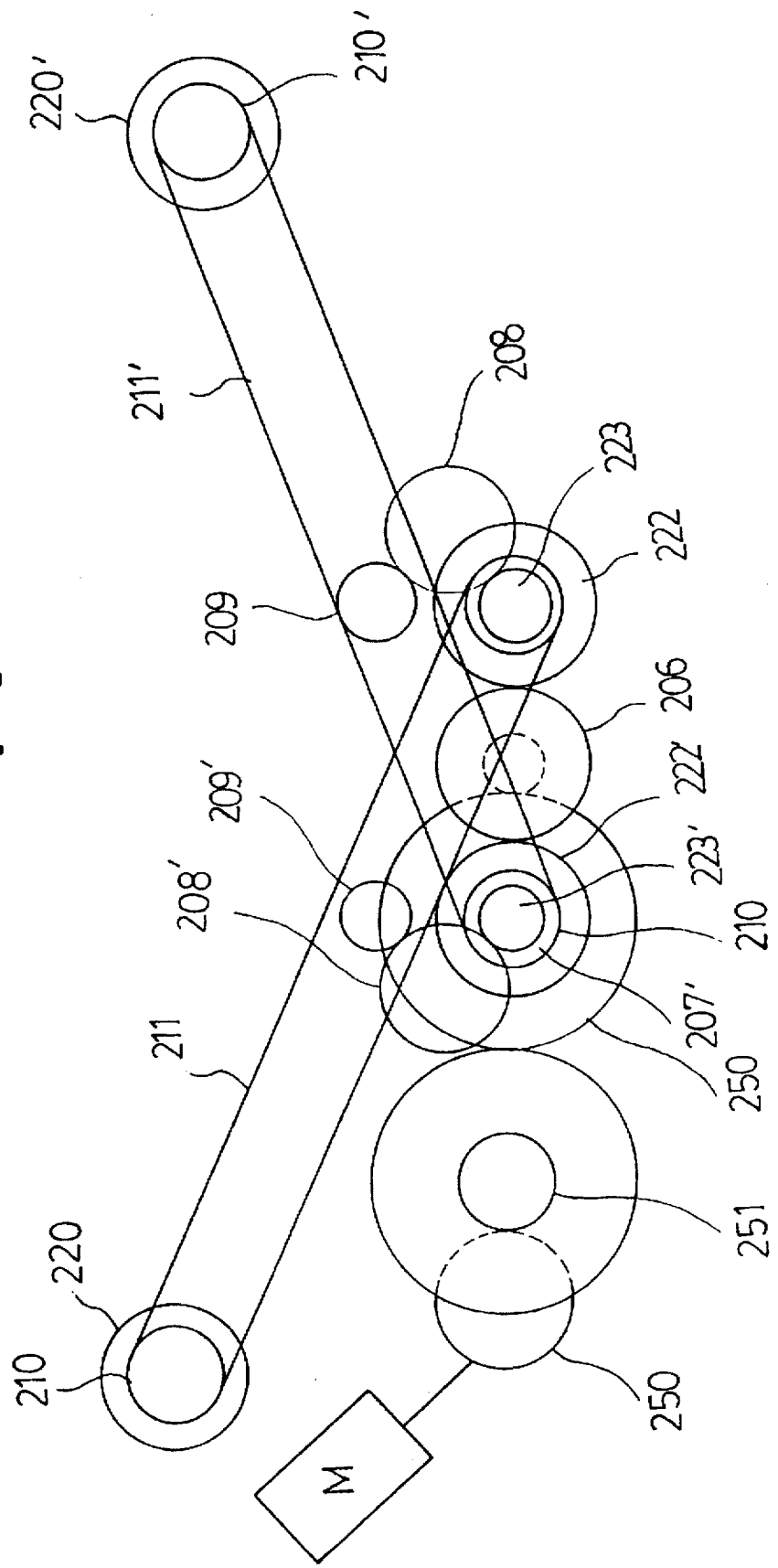
FIG. 21 is a schematic plan view showing the driving operation of the arm unit of the carrier of FIG. 19.

FIG. 21 is a schematic view showing the power transmission mechanism of the arm unit. As shown in this drawing, the arm drive unit for transmitting the drive force to the first and second gears 222 and 222' includes a reversible drive motor, a drive gear 250 fixed to the drive motor shaft, a power transmission gear 251 gearing into the drive gear 250, and a driven gear 252 gearing into the transmission gear 251. The driven gear 252 in turn gears into the variable gear 206. The variable gear 206 selectively gears into either the first gear 222 of the left arm 201 or the second gear 222' of the right arm 202.

The disc feeding device of the above second embodiment does not have the arm drive cam, the first and second arm links and the disc holder unit, unlike the disc feeding device of the first embodiment of the invention.

The above arm unit of the second embodiment of the invention is operated as follows. When the left and right levers 35 and 35' of FIG. 3 are rotated and feed the disc to position B or to position B' of the carrier, the controller is applied with signals of the sensors mounted on the sensor mount 280. This selects an arm to be driven and outputs an electric signal to the solenoid or the variable drive member 240, thus vertically moving the variable gear 206. The variable gear 206 is fixed to the shaft of the solenoid 240.

As a result of the vertical movement of the variable gear 206, either the first or second gears 222 and 222' fixed to the long shafts 223 and 223' gears into the variable gear 206. Hence, the rotating force generated by the arm drive unit is transmitted to either the first gear or the second gear 222 or 222' through the drive gear 250, the transmission gear 251 and the driven gear 252. The first or second gear 222 or 222' gears into the variable gear 206. Therefore, the long shaft 223 or 223' of that gear 222 or 222' gearing into the variable gear 206 is exclusively rotated.

For example, when the first gear 222 gears into the variable gear 206, the guide gear 207, and the timing pulley associated with the first gear 222, are rotated at the same time. The guide gear 207 in turn rotates the idle gear 208 which is geared into the guide gear 207, while the timing pulley in turn rotates the timing belt 211 and thus the timing pulley 210 provided on the front end of the left arm 201.

When the disc is applied with a resistance during the initial movement or the horizontal movement of the disc, the arm 201 will be overloaded and stopped or prevented from smooth movement. In this case, the arm 201 is applied with a resistance larger than the resistance of the friction member of the oil damper gear 209, reducing the rotating velocity of the long shaft 223, and the arm 201 is not moved. However, the long shaft 223 in this case is simply applied with the rotating force of the arm drive member so that the long shaft 223 runs idle. Therefore, the timing pulley associated with the shaft 223 is rotated at high speed so that the timing belt 211 is rotated. The timing pulley 210 provided on the front end of the arm 201 is rotated along with the arm roller 220 exposed to the bottom of the front end of the arm 201.

At this time, the arm roller 220 contacts the edge of the disc so that the rotating force of the arm roller 220 is transmitted to the disc and rolls the disc. Due to the rolling motion of the disc, the disc overcomes the resistance and the arm 201 smoothly moves to position C of the carrier.

When the rolling disc reaches the center C of the carrier, the arm drive member is stopped by the electric signal of the arm sensor S12. Thereafter, the arm drive member is rotated reversely so that the arm 201 returns to its original position.

The disc placed on the carrier should be fed to the magazine or to the disc player.. This motion for feeding the disc from the carrier to the magazine or to the disc player is carried out by the right arm 202 which has been stopped in the above-described operation.

When the arm drive member is applied with power under the control of the controller, the solenoid or the variable drive member 240 is started to move the variable gear 206 down and allow the gear 206 to gear into the second gear 222'.

At this time, when the arm roller 220' comes into contact with the disc placed in position C of the carrier in the same manner as described for the left arm 201, the arm roller 220' of the right arm 202 rolls and feeds the disc to position B of the carrier.

When the right arm 202 continuously feeds the disc to the magazine, the sensor S10' senses the disc and outputs a stop signal to the controller thereby stopping the arm drive member. Thereafter, the arm drive member is rotated reversely so that the arm 202 returns to its original position.

In the disc feeding device according to the second embodiment of the invention, the moving range of the arms crossing each other is divided by stages so that the arm motion for taking the disc out of the magazine or for inserting the disc into the magazine is sensed by the sensor. In addition, when the rotating motions of the arms are overloaded due to resistance of the friction members of the oil damper gears, the arm rollers contacting the disc are rotated and roll the disc so that the selected disc is precisely moved. Therefore, the disc is automatically and simply changed with another disc in the autochanger. With the horizontal movement of the disc, the size and weight of the autochanger can be reduced. In other words, the recent trend of compactness of the autochanger can be achieved.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

What is claimed is:

1. A disc feeding device for a carrier of an autochanger, said carrier feeding discs between a plurality of disc magazines and a disc player, comprising:
    lever means for feeding a disc from a magazine to a predetermined position of the carrier comprising:
        a rotatable lever drive cam; and
        a pair of levers each coupled to said lever drive cam through associated lever links, inside ends of the lever links being pivoted to the lever drive cam through respective pins and each lever rotated when a corresponding pin is rotated in accordance with a rotating direction of the lever drive cam;
    arm means for feeding the disc from the predetermined position of the carrier to the center of the carrier or from the center of the carrier to a magazine comprising:
        a rotatable arm drive cam; and
        a pair of arms each coupled to said arm drive cam through a first arm link and a second arm link, inside ends of the first arm link and the second arm link being pivoted to the arm drive cam through respective pins and each arm rotated when a corresponding pin is rotated in accordance with a rotating direction of the arm drive cam;
    guide rail means for supporting and guiding the disc, said guide rail means comprising at least one curved disc rail and at least one curved holder rail;
    disc holder means for precisely seating the disc on the center of the carrier, said disc holder means comprising disc holders each operated when an end of a disc holder drive cam pushes down a disc holder in accordance with a rotating direction of the disc holder drive cam, said disc holder drive cam being commonly mounted to a shaft of the lever drive cam and cooperating with the lever drive cam; and
    drive means comprising:
        first power transmission means for transmitting the rotating force of a lever drive motor to said lever drive cam and to said disc holder means; and
        second power transmission means for transmitting the rotating force of an arm drive motor to said arm drive cam.

2. The disc feeding device according to claim 1, wherein said disc rail of the guide rail means is formed by coupling a top disc rail and a bottom disc rail such that a disc contact portion of the disc rail is tapered, and
    said holder rail of the guide rail means is formed by coupling a top holder rail and a bottom holder rail such that a disc contact portion of the holder rail is tapered.

3. The disc feeding device according to claim 2, wherein said holder rail is formed into a curved rail.

4. The disc feeding device according to claim 2, wherein the bottom of said disc rail is provided with a plurality of disc position check sensors.

5. The disc feeding device according to claim 4, wherein said disc position check sensors are mounted on a printed circuit board (PCB) provided on the top surface of a front end of said bottom disc rail.

6. The disc feeding device according to claim 1, wherein each of said levers of the lever means has an L-shaped configuration, and one end of each said lever is provided with a lever roller for contact with the edge of the disc, while the other end of the lever is pivoted to a lever bracket through a lever pin such that the lever is turned about the lever pin.

7. The disc feeding device according to claim 1, wherein inside ends of the first arm link and the second arm link of the arm means are pivoted to the arm drive cam such that there is formed a predetermined angle between the first arm link and the second arm link and outside ends of the first arm link and the second arm link are connected to each other by a spring.

8. The disc feeding device according to claim 7, wherein the pair of arms coupled to the arm drive cam through the first arm link and the second arm link cross each other.

9. The disc feeding device according to claim 8, wherein the pair of arms comprises disc contact ends, and wherein said disc contact ends of the pair of arms are provided with rollers.

10. The disc feeding device according to claim 1, further comprising an arm frame bracket comprising a plurality of holes, wherein front ends of said disc holders are provided with tips, said tips extending through associated holes of the arm frame bracket such that the tips protrude out of the holes.

11. The disc feeding device according to claim 1, wherein said first power transmission means for transmitting the rotating force of the lever drive motor to both the lever means and the disc holder means comprises a lever drive cam gear, a pulley unit and a gear train mounted to a common shaft of both the lever drive cam and the disc holder drive cam.

12. The disc feeding device according to claim 11, further comprising a lever drive cam spring provided between said lever drive cam and said lever drive cam gear, both ends of said lever drive cam spring being supported by a stopper of the lever drive cam gear and by a stopper of the lever drive cam.

13. The disc feeding device according to claim 12, wherein said stoppers are arranged such that the stoppers are positioned parallel with respect to each other.

14. The disc feeding device according to claim 1, wherein said second power transmission means for transmitting the rotating force of the arm drive motor to the arm drive cam includes an arm drive cam gear, a pulley unit and a gear train mounted to a shaft of the arm drive cam.

15. The disc feeding device according to claim 14, further comprising an arm drive cam spring provided between said arm drive cam and said arm drive cam gear, both ends of said arm drive cam spring being supported by a stopper of the arm drive cam gear and by a stopper of the arm drive cam.

16. The disc feeding device according to claim 15, wherein said stoppers are arranged such that the stoppers are positioned parallel with respect to each other.

* * * * *